(12) United States Patent
Gibson et al.

(10) Patent No.: US 8,491,767 B2
(45) Date of Patent: Jul. 23, 2013

(54) ELECTROPHORETIC CELL AND METHOD EMPLOYING DIFFERENTIAL MOBILITY

(75) Inventors: Gary Gibson, Palo Alto, CA (US); Richard H. Henze, San Carlos, CA (US); Yoocharn Jeon, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 715 days.

(21) Appl. No.: 12/260,994

(22) Filed: Oct. 29, 2008

(65) Prior Publication Data

US 2010/0101952 A1    Apr. 29, 2010

(51) Int. Cl.
*G01N 27/447*    (2006.01)
*G01N 27/453*    (2006.01)

(52) U.S. Cl.
USPC ............ 204/450; 204/600; 345/107; 359/296

(58) Field of Classification Search
USPC ..................... 204/450, 600; 345/107; 359/296
See application file for complete search history.

(56) References Cited

U.S. PATENT DOCUMENTS

| | | |
|---|---|---|
| 4,418,346 A | 11/1983 | Batchelder |
| 5,106,468 A | 4/1992 | Chimenti |
| 6,693,620 B1 | 2/2004 | Herb et al. |
| 7,038,655 B2 | 5/2006 | Herb et al. |
| 7,050,040 B2 | 5/2006 | Daniel et al. |
| 7,226,550 B2 | 6/2007 | Hou et al. |
| 2004/0257635 A1* | 12/2004 | Paolini et al. ................. 359/296 |
| 2005/0168799 A1* | 8/2005 | Whitesides et al. .......... 359/296 |
| 2006/0077190 A1 | 4/2006 | Zhou et al. |
| 2006/0202949 A1 | 9/2006 | Danner et al. |
| 2007/0268562 A1 | 11/2007 | Chopra et al. |

OTHER PUBLICATIONS

Andrei S. Dukhin et al., "Aperiodic capillary electrophoresis method using an alternating current electric field for separation of macromolecules," Electrophoresis, 2005, vol. 26, pp. 2149-2153.
Siegfried Stotz, "Field Dependence of the Electrophoretic Mobility of Particles Suspended in Low-Conductivity Liquids," Journal of Collod and Interface Science, vol. 65, No. 1, Jun. 1, 1978, pp. 118-130.
P.S. Vincett, "High-Field Electrophoresis of Insulating Particles in Insulating Liquids, I." Journal of Colloid and Interface Science, vol. 76, No. 1, Jul. 1980, pp. 83-94.
P.S. Vincett, "High-Field Electrophoresis of Insulating Particles in Insulating Liquids, II." Journal of Colloid and Interface Science, vol. 76, No. 1, Jul. 1980, pp. 95-106.

(Continued)

*Primary Examiner* — J. Christopher Ball

(57) ABSTRACT

An electrophoretic cell and methods of switching an electrophoretic cell and moving charged species in an electrophoretic cell employ differential electrophoretic mobilities and a time-varying electric field. The methods include providing first and second charged species that are oppositely charged and have different mobilities. The method of switching further includes inducing a net motion of both of the charged species using the time-varying applied electric field. The induced net motion results in either the first charged species being moved toward the electrode and the second charged species remaining essentially motionless or both of the charged species being moved toward the same electrode. The electrophoretic cell includes the first and second charged species with opposite charge and different mobilities, and further includes the time-varying applied electric field that provides the net motion of the charged species.

15 Claims, 3 Drawing Sheets

OTHER PUBLICATIONS

S. S. Dukhin et al., "Aperiodic Electrophoresis. Directed Drift of Dispersed Particles in a Uniform Anharmonic Alternating Electric Field," Colloid Journal of the USSR, 1987, vol. 49, Pt. 5, pp. 752-755.

A. S. Dukhin, "Aperiodic Electrophoresis of Cells," Colloid Journal of the USSR, 1989, vol. 51, Pt. 1, pp. 13-17.

* cited by examiner

ELECTROPHORETIC CELL AND METHOD EMPLOYING DIFFERENTIAL MOBILITY

CROSS-REFERENCE TO RELATED APPLICATIONS

N/A

STATEMENT REGARDING FEDERALLY SPONSORED RESEARCH OR DEVELOPMENT

N/A

BACKGROUND

1. Technical Field

The invention relates to electrophoretic cells. In particular, the invention relates to mitigating electric field screening in the electrophoretic cells.

2. Description of Related Art

Electrophoresis is an electrokinetic phenomenon in which an electric field is employed to move a charged species. For example, particles dispersed and suspended in a fluid (e.g., a liquid or a gel) may have an associated net charge. Applying an electric field exerts an electrostatic Coulomb force on the dispersed particles that, in turn, induces a motion of the particles. A direction and speed of the induced motion of the particles is a function of a vector orientation of the applied electric field and a net charge associated with the particle. The function is often described in terms of an electrophoretic mobility.

Electrophoresis has a wide range of applications including, but not limited to, the separation of charged analytes in chemistry and biochemistry (e.g., gel electrophoresis, capillary electrophoresis, etc.) and the display of digital data. For example, electrophoretic displays, sometimes referred to as 'e-paper', employ the electrophoretic movement of pigment particles to display information. In general, electrophoretic displays may display information using electrophoretically implemented changes in either a reflection or a transmission characteristic of an electrophoretic cell (e.g., a pixel in the display). For example, a reflective electrophoretic display may display information by selectively moving charged pigment particles toward and away from a viewing surface (e.g., an electrode) of the display. Whether or not the particles are aggregated at the viewing surface effects an amount and, in some cases, a color of light that is reflected from the viewing surface. Transmissive electrophoretic displays often called 'light valves' modulate an illumination signal that passes through the electrophoretic cell by changing a density of suspended charged species that disrupt a passage of the illumination signal using electrophoresis. Chief among the advantages of electrophoretic displays is an inherently low power that is needed to maintain a particular display state.

Electrophoretic cells such as, but not limited to, those used in electrophoretic displays may suffer from electric field screening. Electric field screening occurs when a large number of charged species (e.g., charged particles) accumulate in a vicinity of one or more electrodes. The accumulated charged species screen the electric field and as such, reduce an amount of the electric field that penetrates the electrophoretic cell to further induce a desired motion of charged species toward or away form the electrode. A means for providing electrophoretic motion of particles in an electrophoretic cell that reduced or minimized screening would satisfy a long felt need.

BRIEF SUMMARY

In some embodiments of the present invention, a method of switching an electrophoretic cell is provided. The method of switching comprises providing a first charged species in the electrophoretic cell. The method further comprises providing a second charged species in the electrophoretic cell. The second charged species and the first charged species are oppositely charged and have differing electrophoretic mobilities from one another. The method further comprises inducing a net motion of both the first charged species and the second charged species toward the same electrode using an applied electric field that is time-varying. The switching of the electrophoretic cell is provided by the induced net motion.

In other embodiments of the present invention, an electrophoretic cell is provided. The electrophoretic cell comprises a plurality of charged species between a first electrode and a second electrode. A first charged species of the plurality exhibits a first electrophoretic mobility and a second charged species of the plurality exhibits a second electrophoretic mobility. The second electrophoretic mobility differs from the first electrophoretic mobility. The first and second charged species are oppositely charged. The electrophoretic cell further comprises an electric field between the electrodes. The electric field has a time-varying waveform comprising a first portion that moves the first charged species toward the first electrode and a second portion that moves the second charged species toward the first electrode. The electric field provides a net motion of both the first and second charged species of the plurality that is toward the first electrode.

In yet other embodiments of the present invention, a method of moving charged species in an electrophoretic cell is provided. The method of moving comprises providing a first charged species and a second charged species. The second charge species has a charge that is opposite a charge of the first species. The method further comprises applying an electric field. The applied electric field induces a net motion of the first charged species toward a first electrode and induces either a zero net motion of the second charged species or a net motion of the second charged species toward the first electrode. The electric field has a time-varying waveform comprising a first portion that induces the net motion of the first charged species and a second portion that induces the net motion of the second charged species.

Certain embodiments of the present invention have other features that are one of in addition to and in lieu of the features described hereinabove. These and other features of the invention are detailed below with reference to the following drawings.

BRIEF DESCRIPTION OF THE DRAWINGS

The various features of embodiments of the present invention may be more readily understood with reference to the following detailed description taken in conjunction with the accompanying drawings, where like reference numerals designate like structural elements, and in which.

DETAILED DESCRIPTION

Figure 1:
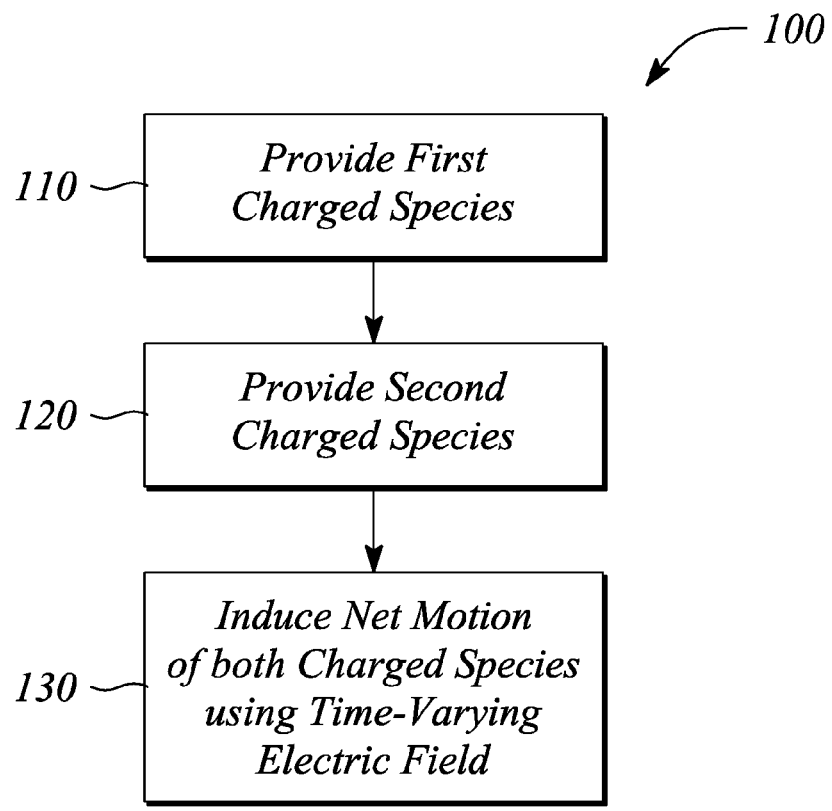
FIG. 1 illustrates a flow chart of a method of switching an electrophoretic cell, according to an embodiment of the present invention.

Embodiments of the present invention provide movement of charged species in an electrophoretic cell. In particular, a net movement of charged species having opposite charges is provided. According to some embodiments, the net movement results in the oppositely charged species being moved in a common or same direction (e.g., toward a common electrode). In other embodiments, a net movement of only a first charged species of a pair of oppositely charged species is provided. In such embodiments, the first charged species experiences a net movement in a particular direction (e.g., toward an electrode) while a second charged species undergoes little or no net motion and instead remains essentially stationary. The present invention applies to electrophoretic cells such as, but not limited to, electrophoretic cells used in displays or for electronic trim (e.g., color) for electronic devices. Such electrophoretic cells may function in either a reflective or a transmissive manner when used in displays or electronic trim, according to the embodiments of the present invention.

In some embodiments, the net movement of the charged species having opposite charges may reduce an effect of electric field screening. Electric field screening, often referred to simply as 'screening' or 'field screening', is a reduction of an electric field intensity or magnitude in a region of the electrophoretic cell between a pair of electrodes. The reduced electric field intensity of screening is caused by an accumulation of a charged species at an electrode. In particular, as a charged species moves under the influence an applied electric field, individual charged species with like charges may accumulate at or near an electrode having an opposite charge to that of the charged species. For example, a first charged species represented by positively charged particles may accumulate at a negative electrode while a second charged species represented by negatively charged particles may similarly accumulate at a positive electrode. The accumulation of the charged species at an electrode essentially blocks or terminates a portion of the electric field produced by that electrode. The terminated portion of the electric field essentially becomes unavailable to or prevented from extending into the inter-electrode space and producing movement of other charged species therewithin.

Screening may reduce a speed with which one or more charged species of an electrophoretic cell react to or are moved by the applied electric field. In particular, a speed of a charged species in an electric field is related to (e.g., may be proportional to) a magnitude of the electric field in a vicinity of the charged species. A reduction in the electric field magnitude due to screening thus reduces a speed of charged species. Thus, screening may reduce an average speed at which one or more charged species moves and, by extension, a speed with which an electrophoretic cell may be switched from one state to another, for example.

For example, as more and more positive charged particles accumulate at a negative electrode, less and less of the applied electric field produced by the negative electrode extends into the electrophoretic cell. Other positively charged particles that have not yet accumulated at, but instead remain at some distance from, the negative electrode experience a reduced electric field magnitude due to screening. These other positively charged particles move with a reduced speed as a result of the reduced electric field. An effect on the positively charged particles is a net reduction in an average speed of the aggregate population. Further, since switching from one state to another in an electrophoretic cell may be related to the average speed, a reduction in the average speed may reduce a switching speed or extend a switching time of the electrophoretic cell.

Screening also may one or both of essentially limit an overall maximum density of charged species (e.g., pigment particles) at an electrode and limit a removal of charged species from a region between electrodes and away from the electrode. In particular, screening may be sufficiently severe as to essentially block the applied electric field from extending into the electrophoretic cell. When the electric field is blocked in this fashion, one or both of additional accumulation of charged species at the electrode and additional removal of charged species from the inter-electrode region may essentially cease. Such a limit on the density of charged species at the electrode and the ability to remove additional charged species from the inter-electrode region may result in a limit on an ultimate performance of the electrophoretic cell.

For example, if the charged species comprises a plurality of colored pigment particles (e.g., white) suspended in an oppositely colored fluid (e.g., black), screening may effectively limit a contrast ratio between states of a reflective electrophoretic cell. In another example, a transmissive electrophoretic cell (e.g., light valve) may exhibit a reduced contrast or ON/OFF ratio due to pigment particles that remain in the inter-electrode region, as a result of screening. The reduction of screening afforded by some embodiments of the present invention may improve the performance of both the transmissive electrophoretic cell and the reflective electrophoretic cell by increasing an ability to remove charged species from the inter-electrode region and accumulate (i.e., pack) the charged species at the electrode, for example.

According to various embodiments of the present invention, a time-varying electric field acting on the oppositely charged species provides a net movement of the charged species in the electrophoretic cell. The electric field may be varied by applying a time-varying voltage to the electrodes of the electrophoretic cell, for example. The time-varying electric field has a first portion and a second portion, according to various embodiments.

In some embodiments, the first portion of the electric field induces a dominant part of a net motion of a first charged species in the electrophoretic cell. The induced net motion of the first charged species may be toward a first electrode, for example. In some embodiments, the second portion of the electric field induces a dominant part of a net motion of a second charged species that is oppositely charged relative to the first charged species. By "dominant part" it is meant that while the net motion may be a function of both portions, the main net motion of a particular species is provided by a respective one of the first and second portions.

In some of these embodiments, the induced net motion of the second charges species is in a same direction as the induced net motion of the first charged species. In other embodiments, the induced net motion of the second charged species is essentially zero. For example, the first charged species may be moved toward the first electrode while the second charged species undergoes essentially no net motion (i.e., zero net motion). In some embodiments, the second portion of the electric field may be a direct current (DC) component while the first portion may be an alternating current (AC) component. In other embodiments, the first portion and the second portion are respectively first and second time segments of the electric field.

In addition to the time-varying electric field, the net movement of the charged species is further influenced by a differential mobility of the oppositely charged species, according to various embodiments of the present invention. In particular, the first charged species has an electrophoretic mobility that differs from an electrophoretic mobility of the second charged species, according to various embodiments. For example, the first charged species may have a first electrophoretic mobility $\mu'_e$ and the second charged species may have a second electrophoretic mobility $\mu''_e$ that is not equal to the first electrophoretic mobility $\mu'_e$ (i.e., $\mu'_3 \neq \mu''_e$).

In various embodiments, an electrophoretic mobility $\mu_e$ of one or both of the charged species is electric field dependent. For example, the first electrophoretic mobility $\mu'_e$ of the first charged species may be a field dependent mobility while the second electrophoretic mobility $\mu''_e$ of the second charged species may be non-field dependent or essentially constant. By 'essentially constant' it is meant that the electrophoretic mobility $\mu''_e$ may be considered a constant value relative to the electrophoretic mobility $\mu'_e$ that is field dependent. In other words, any field dependency of the essentially constant or non-field dependent electrophoretic mobility $\mu''_e$ is small enough to be ignored. In another example, both the first electrophoretic mobility $\mu'_e$ and the second electrophoretic mobility $\mu''_e$ are field dependent. However, the field dependence the first electrophoretic mobility $\mu'_e$ differs for that of the second electrophoretic mobility $\mu''_e$, in this other example.

As used herein, an electrophoretic mobility $\mu_e$ is defined as a coefficient that relates a speed v of a charged species (e.g., a charged particle) to an applied electric field E in a vicinity of the charged species as exemplified by equation (1).

$$v = \mu_e E \quad (1)$$

For example, the electrophoretic mobility $\mu_e$ may have a constant value (e.g., 5) such that a speed or velocity v of the charged species is a linear function of or is linearly proportional to the applied field E. As such, a constant valued electrophoretic mobility $\mu_e$ (or simply a 'constant electrophoretic mobility') produces an essentially linear electrophoretic velocity of the charged species. On the other hand as noted above, a charged species may have a non-constant electrophoretic mobility $\mu_e$, according to the present invention. Non-constant electrophoretic mobilities $\mu_e$ include electrophoretic mobilities $\mu_e$ that are field dependent.

A field dependent electrophoretic mobility $\mu_e$ (E) is an electrophoretic mobility that has a value that changes as a function of the applied electric field E. For example, the field dependent electrophoretic mobility $\mu_e$ (E) may have a value of '1' at a first value of the applied electric field $E_1$ and a value of '10' at a second value of the applied electric field $E_2$ (units omitted for simplicity). In another example, the field dependent electrophoretic mobility $\mu_e$ (E) may have a value of essentially zero (0) at the first applied electric field value $E_1$ and a value of '6' at the second applied electric field $E_2$ value. A field dependent electrophoretic mobility $\mu_e$(E) produces an essentially non-linear electrophoretic velocity v.

Examples of nonlinear or field dependent electrophoretic mobilities $\mu_e$ (E) include, but are not limited to, ones that produce a superlinear electrophoretic velocity v and a sublinear electrophoretic velocity v. A superlinear electrophoretic velocity v produced by a field dependent electrophoretic mobility $\mu_e$ (E) may be characterized by a superlinear function of the applied electric field E such as, but not limited to, $E^2$, $E^3$, $e^E$, for example. In general, a superlinear electrophoretic velocity v resulting from a field dependent electrophoretic mobility $\mu_e$ (E) increases faster as a function of increasing applied electric field E than is true for the linear case. Conversely, sublinear electrophoretic velocity v resulting from a field dependent electrophoretic mobility $\mu_e$ (E) is characterized by a sublinear function of the applied electric field E such as, but not limited to, $E^{1/2}$, $E^{3/4}$.

A number of factors may provide non-constant or field dependent electrophoretic mobility $\mu_e$ (E) of a given charged species. For example, the Wien effect, electromoosmosis or other boundary effects, electrohydrodynamic effects and shape anisotropy have all been identified as leading to or providing an explanation of observed non-constant electrophoretic mobility $\mu_e$ (E). In another example, non-spherical particles (e.g., disk-like or acicular particles) may be employed as a charged species according to the present invention. Such non-spherical particles may exhibit dramatically different electrophoretic mobilities $\mu_e$ as a function of their respective orientation relative to a net movement of the particles. If the non-spherical particles are all essentially aligned with one another (e.g., not randomly aligned) then, as a charged species, a change in the orientation of the non-spherical particles can dramatically change the electrophoretic mobilities $\mu_e$ of the charged species leading to non-linear electrophoretic mobility. Furthermore, the dramatic change in the electrophoretic mobilities $\mu_e$ of such non-spherical particles may be a function of the applied electric field E such that the electrophoretic mobility $\mu_e$ is field dependent. In yet another example, molecules or other constituent elements of a fluid that suspends the charged species may be essentially 'non-spherical'. A liquid crystal material used as a suspension fluid in an electrophoretic cell is an example of such a non-spherical fluid.

The term 'charged species' herein is defined as any thing that has an associated charge or zeta potential and is or can be moved by an applied electric field within an electrophoretic cell. For example, a charged species may be a particle (e.g., pigment particle) suspended in a suspension fluid between a pair of electrodes where the particle carries a charge (e.g., a positive charge '+' or a negative charge '−'). Thus, a first charged species may be one or more positively charged pigment particles suspended in the suspension fluid, for example. In the same example, a second charged species having an opposite charge relative to the first charged species may be a one or more negatively charged particles suspended in the suspension fluid. In another example, the first charged species may be a plurality of charged pigment particles while the second charged species refers to a counter-ion or a micelle produced by charging the first charged species. The counter-ion or micelle may comprise ions or micelles with a charge opposite to the net charge of the charged pigment particles of the first charged species, for example.

Reference to charged species having 'opposite charge' or being 'oppositely charged' means only that the charged species have charges or net charges that are opposite in sign. For example, a first charged species may have a positive (+) charge while an oppositely charged second species may have a negative (−) charge. Moreover, 'oppositely charged' species or species having opposite charges do no necessarily carry opposite charges of the same magnitude. In particular, according to various embodiments herein, a magnitude of a charge of a positively charged species may be and often is different from a magnitude of a charge on a negatively charged species.

For example, a first charged species that is positively charged may carry or have associated with it a net positive charge having a first charge magnitude. A second charged species that is negatively charged may similarly carry or have associated with it a net negative charge having a second charge magnitude. The first charge magnitude may not be equal to the second charge magnitude, by definition herein.

For simplicity herein, no distinction is made between the term 'charged species' as referring to a single item (e.g., a single particle, counter-ion, etc.) and a plurality of such items unless such a distinction is necessary for proper understanding. Further, as used herein, the article 'a' is intended to have its ordinary meaning in the patent arts, namely 'one or more'. For example, 'a layer' generally means one or more layers and as such, 'the layer' means 'the layer(s)' herein. Also, any reference herein to 'top', 'bottom', 'upper', 'lower', 'up', 'down', 'left' or 'right' is not intended to be a limitation herein. Moreover, examples herein are intended to be illustrative only and are presented for discussion purposes and not by way of limitation.

FIG. 1 illustrates a flow chart of a method 100 of switching an electrophoretic cell, according to an embodiment of the present invention. The method 100 of switching facilitates switching a state (e.g., an optical state) of the electrophoretic cell from a first state to a second state. For example, the first state may represent an opaque or optically non-transparent state of a light-valve or transmissive electrophoretic cell while the second state may be a clear or optically transparent state. In another example, the first state may be a first color (e.g., white) while the second state is another color (e.g., black) in a reflective electrophoretic cell. In some embodiments, the method 100 of switching may improve switching time and improve switching fidelity (e.g., contrast ratio) by reducing screening of an applied electric field caused by an accumulation of charged particles near one of a pair of electrodes of the electrophoretic cell.

The method 100 of switching an electrophoretic cell comprises providing 110 a first charged species in the electrophoretic cell. In some embodiments, the provided 110 first charged species is a pigment particle that has a charge. For example, the first charged species may comprise a particle of titanium dioxide that is charged with a positive charge. In another example, the first charge species may comprise a polymeric particle having a negative charge. Providing 110 a first charged species may comprise introducing and suspending the exemplary particle in a fluid suspension of the electrophoretic cell and establishing the charge (e.g., positive or negative) on the particle. The charge may be established by a charging agent of the fluid suspension, for example.

The method 100 of switching an electrophoretic cell further comprises providing 120 a second charged species in the electrophoretic cell. The provided 120 second charge species has a charge that is opposite that of the provided 110 first charged species. Furthermore, the provided 120 second charged species has a mobility that is different from the provided 110 charged species.

For example, the second charged species may be another particle (e.g., pigment particle or polymeric particle). For the exemplary other particle, providing 120 a second charged species may comprise introducing and suspending the other particle in the fluid suspension of the electrophoretic cell followed by establishing the charge on the other particle. The established charge on the provided 120 second charged species is opposite the established charge of the provided 110 first charged species. In another example, the second charged species may comprise a counter-ion. The counter-ion may be provided 120 in conjunction with providing 110 the first charged species, for example. The exemplary provided 120 second charged species may have one or more of a surface characteristic, a size, and a shape that imparts an electrophoretic mobility field dependence to the provided 120 second charged species that is different from the electrophoretic mobility of the provided 110 first charged species, for example.

Figure 2A:
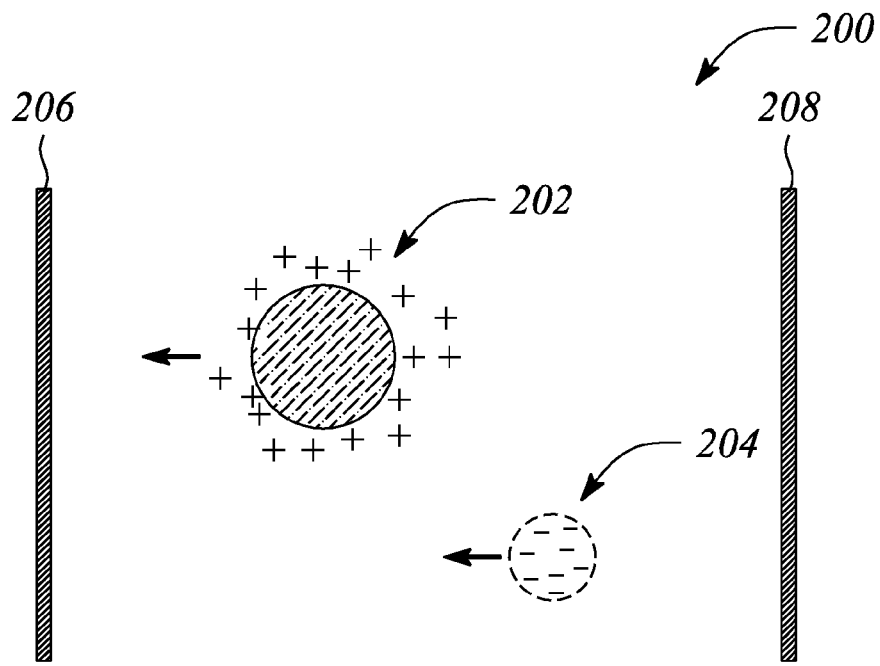
FIG. 2A illustrates a cross sectional view of an electrophoretic cell, according to an embodiment of the present invention.

FIG. 2A illustrates a cross sectional view of an electrophoretic cell 200, according to an embodiment of the present invention. In particular, FIG. 2A illustrates a provided 110 first charged species 202 and a provided 120 second charged species 204 suspended between a first electrode 206 and a second electrode 208 of the electrophoretic cell 200. For example, the first and second charged species 202, 204 may be suspended between the electrodes 206, 208 by being dispersed in a non-polar solvent (e.g., dodecane or Isopar). Isopar is a brand name of high-purity isoparaffinic solvents marketed by Exxon Mobile Corporation, Fairfax, Va.

As illustrated, the first charged species 202 represents a pigment particle 202 and has a net positive charge (i.e., as indicated by '+' in the figure). Further as illustrated, the provided 120 second charged species 204 comprises a counter-ion 204 created when the first charged species 202 was charged. The counter-ion 204 has a negative (−) charge. The particle/counter-ion system illustrated in FIG. 2A is characteristic of many single-particle electrophoretic cells when using a non-polar solvent, for example. In an exemplary electrophoretic cell using a non-polar solvent, the counter-ions may be in the form of inverse micelles that are provided by a charging agent added to the system, for example.

In various embodiments, the electrophoretic mobility of one or both of the first charged species and the second charged species is field dependent. For example, the electrophoretic mobility of the first charged species may be field dependent while the electrophoretic mobility of the second charged species may be essentially field independent or constant. In another example, the electrophoretic mobility of the first charged species is field independent and the electrophoretic mobility of the second charged species is field dependent. The field dependent mobility may provide an electrophoretic velocity that is one of superlinear or sublinear, for example. In yet another example, the electrophoretic mobilities of both of the first and second charged species are field dependent. The first charged species may have a superlinear electrophoretic velocity while the second charged species may have a sublinear electrophoretic velocity, for example.

Referring again to FIG. 1, the method 100 of switching an electrophoretic cell further comprises inducing 130 a net motion of both the first charged species and the second charged species. Inducing 130 a net motion uses an electric field that is time-varying. The electric field is applied to the electrophoretic cell. The net motion is motion that occurs over a plurality of time periods of and in response to the time-varying applied electric field. The switching of the electrophoretic cell is provided by the induced net motion. In some embodiments, inducing 130 a net motion provides a net motion of both charged species toward the same electrode.

For example, referring to FIG. 2A, inducing 130 a net motion may result in both the positively charged pigment particle 202 and the negatively charge counter-ion 204 moving toward the first electrode 206. The induced 130 net motion is illustrated in FIG. 2A as a pair of arrows, one arrow of the pair being associated with each of the charged species 202, 204.

In other embodiments (not illustrated in FIG. 2A), inducing 130 a net motion provides a net motion of the first charged species toward an electrode but results in an essentially zero net motion of the second charged species. In either case, it should be pointed out that the induced 130 net motion does not provide a net motion of the first charged species that is in an opposite direction from a net motion of the second charged species as is characteristic of conventional electrophoresis systems.

In various embodiments, the applied electric field has a first portion and a second portion. The first portion of the applied electric field induces a dominant part of the net motion of the first charged species. The second portion of the applied electric field induces a dominant part of the net motion of the second charged species. In some embodiments, the first portion of the applied electric field comprises an alternating current (AC) component and the second portion of the applied electric field comprises a direct current (DC) component. In some embodiments, the DC component may be essentially zero.

For example, the first charged species may have a super-linear electrophoretic velocity due to a field dependent mobility and carry a positive charge while the second charged species is negatively charged and has a sublinear electrophoretic velocity provided by a different field dependent mobility. The AC component of the electric field may be characterized by a waveform that, during one period, exhibits a relatively short duration, high magnitude, negative valued section followed by a relatively longer duration, relatively lower magnitude, positive valued section. Owing to the linear electrophoretic velocity due to its field dependent electrophoretic mobility, the first charged species moves a greater distance toward a first electrode during the negative valued section than the first charged species moves away from the first electrode during the positive valued section of the waveform that characterizes the applied electric field. Thus, a net motion of the first charged species is toward the first electrode.

Continuing with the example, the applied electric field may have a DC component that is positive. Such a situation exists if a time integral of the waveform of the applied electric field is positive, for example. The negatively charged second charged species, owing to its field dependent mobility provided sublinear electrophoretic velocity, will experience a net motion toward the first electrode when subjected to such a positive DC component. In particular, while the second charged species may oscillate between motion toward and away from the first electrode, a time average of the motion (net motion) will be toward the first electrode. Thus, both the exemplary first charged species and the exemplary second charged species exhibit a net motion toward the first electrode.

In a variation of the example above, the DC component may be essentially zero. In that case, the net motion of the exemplary second charged species would be essentially zero, as well. However, the exemplary first charged species would still experience a net motion toward the first electrode. It should be noted that either combined net motion toward the first electrode or net motion of only the exemplary first charged species with zero net motion of the exemplary second charged species may reduce screening in some embodiments. In other embodiments, such net motion may minimize screening.

Figure 2B:
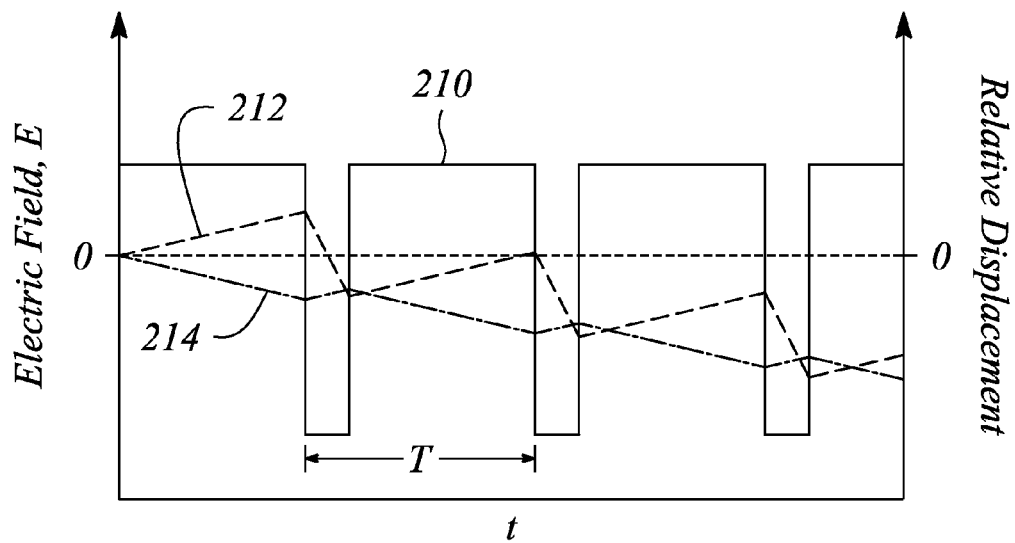
FIG. 2B illustrates a graph of an exemplary applied electric field and an exemplary net motion as a function of time, according to an embodiment of the present invention.

FIG. 2B illustrates a graph of an exemplary applied electric field and an exemplary net motion as a function of time, according to an embodiment of the present invention. Specifically, FIG. 2B illustrates the time-varying electric field 210 as a function of time t that is used during inducing 130 net motion of the method 100. The time-varying electric field 210 is represented in FIG. 2B as a waveform 210 that may be applied across the first and second electrodes 206, 208 of FIG. 2A, for example. Also illustrated are a resulting motion 212 of a first charged species and a resulting motion 214 of the second charged species. The resulting motions 212, 214 of the respective charged species is illustrated as a relative displacement from an arbitrary initial starting position as a function of time, t. In the example of FIG. 2B, it is assumed that an electrophoretic velocity of the first charged species is superlinear while an electrophoretic velocity of the second charged species is sublinear.

A time integral of the electric field E in the example illustrated in FIG. 2B has a value that is greater than zero. As such, the exemplary time-varying electric field 210 comprises a positive component or portion (i.e., an integral with respect to time t of the waveform illustrated in FIG. 2B is greater than zero). The DC component of the electric field E induces 130 a net motion of the second charged species that is negative. Note that while the motion 214 of the second charged species is both positively and negatively directed, as illustrated, a dominant part of the net motion is negative due to negative charge and sublinear electrophoretic velocity of the second charged species and the negative DC component of the time-varying electric field.

Likewise, the first charged species moves in both a positive direction and a negative direction under the influence of the time-varying electric field 210. However, during each period T of the time-varying electric field 210, the positive directed motion is smaller than the negative directed motion due to the field dependent electrophoretic mobility of the exemplary first charged species. Thus, a dominant part of the net motion of the first charged species is also negatively directed, as illustrated in FIG. 2B, and the induced 130 net motion of both charged particles is in the same direction (i.e., negative).

Figure 2C:
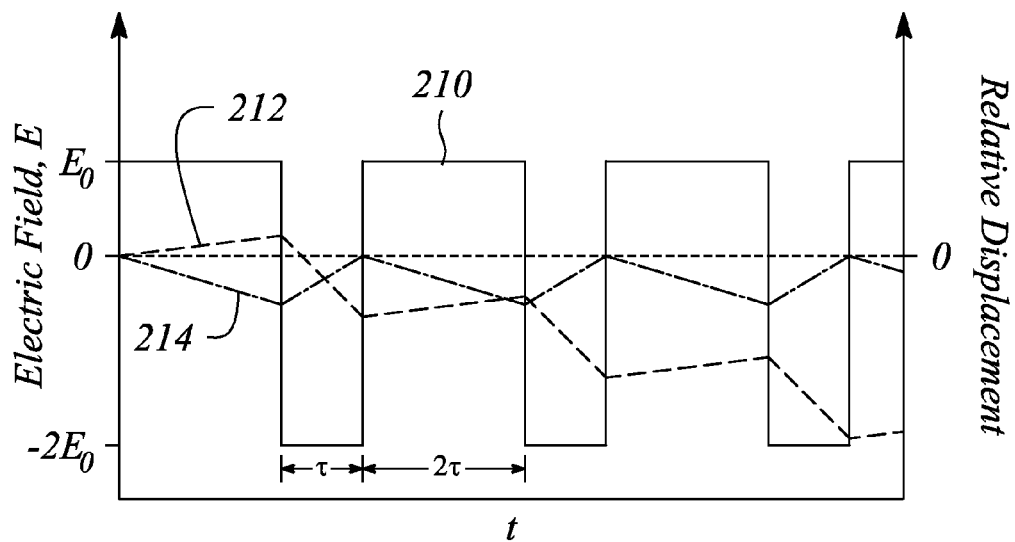
FIG. 2C illustrates a graph of a waveform of an applied electric field, according to another embodiment of the present invention.

FIG. 2C illustrates a graph of a waveform of an applied electric field, according to another embodiment of the present invention. In particular, FIG. 2C illustrates a waveform 210 that has both an AC component that oscillates between $E_0$ and $-2E_0$ and a DC component equal to zero (i.e., an integral with respect to time t of the waveform in FIG. 2C is equal to zero). Such a waveform 210 may be used to induce 130 a non-zero dominant part of a net motion in a first charged species having a field dependent electrophoretic mobility while a dominant part of a net motion of a second charged species with a non-field dependent (constant) electrophoretic mobility is essentially zero.

Specifically, as illustrated in FIG. 2C, the motion 212 of the first charged species, while both positive and negative, trends (i.e., dominant part) negative due to the field dependent electrophoretic mobility provided superlinear electrophoretic velocity of the first charged species. The motion 214 of the second charged particle oscillates between positive and negative as well. However, due the non-field dependent electrophoretic mobility of the second charged particle, an amount of negative motion is offset by an amount of positive motion resulting in essentially zero net motion, as illustrated. In other words, the dominant part of the net motion is zero. So, a first portion or the AC component of the waveform (i.e., applied electric field) provides the dominant part of the net motion of the first charge species in a net negative direction while a second portion or the DC component of the waveform results in an essentially zero net motion of the second charged species.

In other embodiments (not illustrated), the applied electric field comprises a first portion that has a first polarity and a first duration and a second portion that has a second polarity and a second duration. In these embodiments, the first portion may be considered a first time segment of the applied electric field while the second portion may be considered a second time segment of the applied electric field. The first and second time segments of the applied electric field may be essentially sequential, for example. Further, in these embodiments the net motion of the first and second charged species is provided by a combination of the first portion and second portions. In particular, a combination of the first and second portions of the applied electric field acts differently on the first charged species and the second charged species to induce the net motion. However, a dominant part of the net motion of the first charged species is essentially provided by the first portion (or first time segment) while a dominant part of the net motion of the second charged species is essentially provided by the second portion (or second time segment), for example.

In such embodiments, the first and second portions of the electric field may act, in conjunction with the electrophoretic mobility of the first charged species, to move the first charged species toward a first electrode. While the first and second portions of the electric field may move the first charged species toward and away from the first electrode, a net motion of the first charged species is toward the first electrode. Concomitantly, the first and second portions of the applied electric field may act, in conjunction with the electrophoretic mobility of the second charged species, to either move second charged species toward the first electrode or essentially maintain a location of the second charged species.

For example, an electrophoretic mobility of both the first charged species and the second charged species may be field dependent. In particular, a magnitude of the electrophoretic mobility of the first charged species may be less than a magnitude of the electrophoretic mobility of the second charged species for a first value of the applied electric field. Moreover, the magnitude of the electrophoretic mobility of the first charged species may be more than the magnitude of the electrophoretic mobility of the second charged species for a second value of the applied electric field. In such an example, a time-varying applied electric field that switches between the first value and the second value may be used to move both charged species toward a common electrode.

There are numerous other combinations of differential electrophoretic mobility and time-varying applied electric field that are applicable to the various embodiments of the present invention, but are not described herein. From the above examples and discussion, it should be clear how to select combinations that result in the above-described net motion of the first charged species and the second charged species. All of such combinations are within the scope of the present invention.

Figure 3:
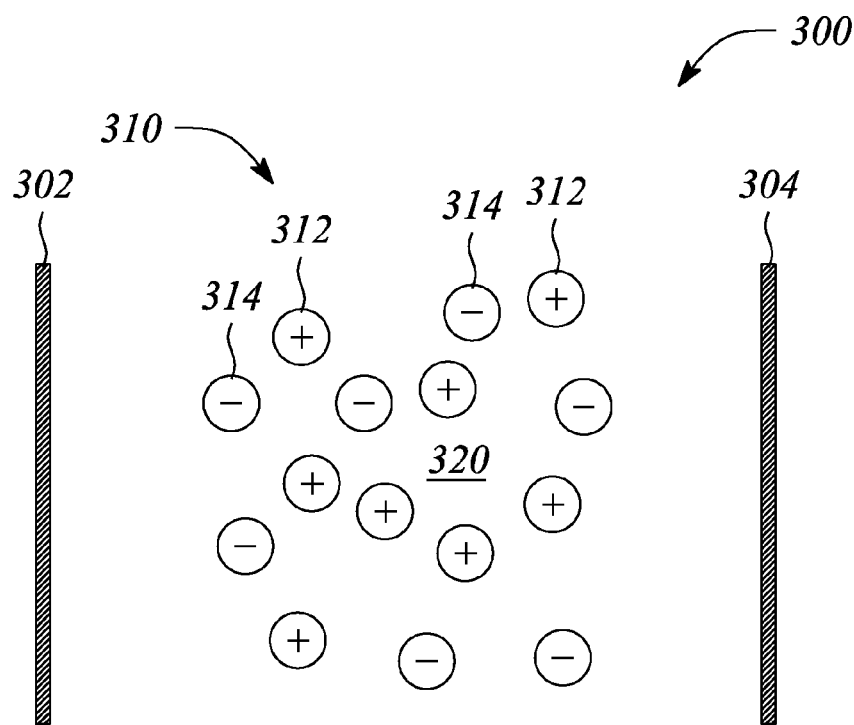
FIG. 3 illustrates a cross sectional view of an electrophoretic cell, according to another embodiment of the present invention.

FIG. 3 illustrates a cross sectional view of an electrophoretic cell 300, according to another embodiment of the present invention. The electrophoretic cell 300 comprises a first electrode 302 and a second electrode 304. The electrophoretic cell 300 further comprises a plurality of charged species 310 between the first electrode 302 and a second electrode 304. A first charged species 312 of the plurality 310 exhibits a first electrophoretic mobility. A second charged species 314 of the plurality 300 exhibits a second electrophoretic mobility. The second electrophoretic mobility differs from the first electrophoretic mobility. Further, the first charged species 312 and the second charged species 314 are oppositely charged. The opposite charges of the first charged species 312 and the second charged species 314 are illustrated in FIG. 3 using a '+' and '−', respectively, by way of example and not limitation. In some embodiments, the first charge species 312 and the second charged species 314 are essentially similar to the provided 110 first charged species and the provided 120 charged species described above with respect to the method 100 of switching an electrophoretic cell.

In some embodiments, the first electrophoretic mobility of the first charged species 312 is field dependent. In some of these embodiments, the second electrophoretic mobility of the second charged species 314 is essentially field independent relative to the first mobility. In other embodiments, the electrophoretic mobility of the first charged species 312 is field independent while the electrophoretic mobility of the second charged species 314 is field dependent. In yet other embodiments, the electrophoretic mobility of both of the first charged species 312 and the second charged species 314 is field dependent.

The electrophoretic cell 300 further comprises an electric field 320 between the electrodes 302, 304. The electric field 320 is characterized by or has a time-varying waveform. In some embodiments, a first portion of the electric field 320 moves the first charged species 312 toward the first electrode 302. In some embodiments, a second portion of the electric field 320 moves the second charged species 314 toward the first electrode 302. As such, the electric field 320 provides a net motion of both of the charged species 312, 314 of the plurality 310 that is toward the first electrode 302. In some embodiments, the electric field 320 is essentially similar to the electric field used in inducing 130 net motion described above with respect to the method 100 of switching an electrophoretic cell.

In some embodiments, the first portion of the electric field 320 comprises an alternating current (AC) component and the second portion comprises a direct current (DC) component of the electric field 320. In some of these embodiments, the DC component has a polarity that provides the dominant part of the net motion of the second charged species 314 toward the first electrode 302.

Figure 4:
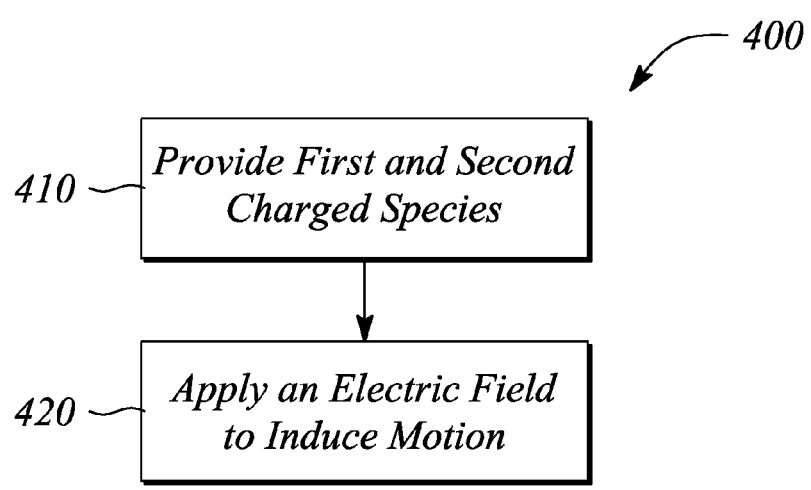
FIG. 4 illustrates a flow chart of a method of moving charged species in an electrophoretic cell according to an embodiment of the present invention.

FIG. 4 illustrates a flow chart of a method 400 of moving charged species in an electrophoretic cell. As illustrated, the method 400 of moving comprises providing 410 a first charged species and a second charged species. The provided 410 second charge species has a charge that is opposite a charge of the provided 410 first charged species. Providing 410 may be essentially similar to providing 110, 120 first and second charged species described above with respect to the method 100 of switching, according to some embodiments.

In some embodiments, the provided 410 first charged species may have a field dependent electrophoretic mobility. In some of these embodiments, the provided 410 second charged species may have an electrophoretic mobility that is essentially field independent relative to the field dependent electrophoretic mobility of the first charged species. In other embodiments, both of the first charged species and the second charged species may have field dependent electrophoretic mobilities.

The method 400 of moving further comprises applying 420 an electric field. The applied 420 electric field induces a dominant part of a net motion of the first charged species toward a first electrode. The applied 420 electric field further induces either a zero net motion of the second charged species or a net motion of the second charged species toward the first electrode. In some embodiments, the electric field has a time-varying waveform that comprises a first portion and a second portion. The first portion induces the net motion of the first charged species and a second portion induces the net motion of the second charged species. In some embodiments, the electric field that is applied 420 may be essentially similar to the time-varying electric field used in inducing 130 net motion described above with respect to the method 100 of switching an electrophoretic cell.

Thus, there have been described embodiments of a method of switching an electrophoretic cell, an electrophoretic cell, and a method of moving charged species in an electrophoretic cell that employ differential mobility and time-varying electric fields to move charged species. It should be understood that the above-described embodiments are merely illustrative of some of the many specific embodiments that represent the principles of the present invention. Clearly, those skilled in the art can readily devise numerous other arrangements without departing from the scope of the present invention as defined by the following claims.

What is claimed is:

1. A method of switching an electrophoretic cell, the method comprising:
    providing a first charged species in the electrophoretic cell;
    providing a second charged species suspended together in a suspension fluid with the first charged species in the electrophoretic cell, the second charged species and the first charged species being oppositely charged and having different electrophoretic mobilities from one another in the suspension fluid; and
    inducing a net motion of both of the charged species using an applied electric field that is time-varying, the induced net motion resulting in either the first charged species being moved toward the electrode and the second charged species having substantially zero net motion and remaining essentially motionless or both of the charged species being moved toward the same electrode,
    wherein switching of the electrophoretic cell is provided by the induced net motion.

2. The method of switching an electrophoretic cell of claim 1, wherein the electrophoretic mobility of the first charged species is field dependent.

3. The method of switching an electrophoretic cell of claim 2, wherein the field dependent electrophoretic mobility of the first charged species produces a superlinear velocity of the first charged species and the electrophoretic mobility of the second charged species is essentially field independent relative to the field dependent electrophoretic mobility of the first charged species.

4. The method of switching an electrophoretic cell of claim 1, wherein the electrophoretic mobilities of both the first charged species and the second charged species are field dependent, the field dependent electrophoretic mobility of the first charged species producing a superlinear velocity of the first charged species and the field dependent electrophoretic mobility of the second charged species producing a sublinear velocity of the second charged species.

5. The method of switching an electrophoretic cell of claim 1, wherein the applied electric field has a first portion and a second portion, the first portion inducing a dominant part of the net motion of the first charged species, the second portion inducing a dominant part of the net motion of the second charged species.

6. The method of switching an electrophoretic cell of claim 5, wherein the first portion of the applied electric field comprises an alternating current (AC) component and the second portion comprises a direct current (DC) component of the applied electric field.

7. The method of switching an electrophoretic cell of claim 5, wherein the first portion of the applied electric field comprises a first time segment of the applied electric field and the second portion comprises a second time segment of the applied electric field.

8. The method of switching an electrophoretic cell of claim 6, wherein the first portion and the second portion of the applied electric field each have a respective polarity and comprise a respective magnitude, the first portion polarity being opposite the second portion polarity, the first portion magnitude being greater than the second portion magnitude.

9. The method of switching an electrophoretic cell of claim 1, wherein the time-varying electric field is characterized by a rectangular waveform comprising a first portion and a second portion, the first portion having each of a first polarity, a first magnitude and a first duration, the second portion having each of a second polarity, a second magnitude and a second duration, wherein the first polarity is opposite the second polarity, the first magnitude being greater than the second magnitude, the second duration being longer than the first duration, and wherein the electrophoretic mobility of the first charged species is field dependent, the electrophoretic mobility of the second charged species being essentially field independent, a dominant part of the net motion of the first charged species being provided by the first portion of the time-varying electric field, a dominant part of the net motion of the second charged species being provided by the second portion of the time-varying electric field.

10. The method of switching an electrophoretic cell of claim 1, wherein the first charged species comprises a charged particle and the second species comprises a counter ion associated with the charged particle of the first charged species.

11. An electrophoretic cell comprising:
    a plurality of charged species suspended together in a suspension fluid between a first electrode and a second electrode, a first charged species of the plurality exhibiting a first electrophoretic mobility in the suspension fluid, a second charged species of the plurality exhibiting a second electrophoretic mobility that differs from the first electrophoretic mobility in the suspension fluid, the first and second charged species being oppositely charged; and
    an electric field between the electrodes, the electric field having a time-varying waveform comprising a first portion that moves the first charged species toward the first electrode and a second portion that moves the second charged species toward the first electrode,
    wherein the electric field provides a net motion of both of the charged species of the plurality that is toward the first electrode.

12. The electrophoretic cell of claim 11, wherein the first electrophoretic mobility of the first charged species is field dependent, the second electrophoretic mobility of the second charged species being essentially field independent relative to the first electrophoretic mobility.

13. The electrophoretic cell of claim 11, wherein the first portion of the electric field comprises an alternating current (AC) component, the herein the DC component has a polarity that provides a dominant part of the net motion of the second charged species toward the first electrode.

14. A method of moving charged species in an electrophoretic cell, the method comprising:
    providing together in a suspension fluid of the electrophoretic cell a first charged species and a second charged species, the second charge species having a charge that is opposite a charge of the first charged species;
    applying an electric field, the applied electric field inducing a net motion of the first charged species toward a first electrode, the applied electric field inducing either a zero net motion of the second charged species or a net motion of the second charged species toward the first electrode,
    wherein the electric field has a time-varying waveform comprising a first portion that induces a dominant part of the net motion of the first charged species and a second portion that induces a dominant part of the net motion of the second charged second species comprises a counter ion associated with the charged particle of the first charged species.

15. The method of moving charged species of claim 14, wherein the first charged species has a field dependent electrophoretic mobility, the second charged species having an electrophoretic mobility that is essentially field independent relative to the field dependent electrophoretic mobility of the first charged species.

* * * * *

UNITED STATES PATENT AND TRADEMARK OFFICE
CERTIFICATE OF CORRECTION

PATENT NO. : 8,491,767 B2
APPLICATION NO. : 12/260994
DATED : July 23, 2013
INVENTOR(S) : Gary Gibson et al.

It is certified that error appears in the above-identified patent and that said Letters Patent is hereby corrected as shown below:

In the Claims:

In column 14, line 37, in Claim 11, delete "that moves" and insert -- to move --, therefor.

In column 14, line 38, in Claim 11, delete "that moves" and insert -- to move --, therefor.

In column 14, line 40, in Claim 11, delete "provides" and insert -- to provide --, therefor.

In column 14, line 50, in Claim 13, delete "herein" and insert -- second portion comprising a direct current (DC) component of the electric field, and wherein --, therefor.

In column 15, line 1, in Claim 14, delete "charged" and insert -- charged species, and wherein the first charged species comprises a charged particle and the --, therefor.

Page 1 of 1

Signed and Sealed this
Twelfth Day of November, 2013

Teresa Stanek Rea
*Deputy Director of the United States Patent and Trademark Office*